United States Patent [19]

Konomura et al.

[11] Patent Number: 4,472,024
[45] Date of Patent: Sep. 18, 1984

[54] APPARATUS FOR DRIVING OBJECTIVE LENS

[75] Inventors: Yutaka Konomura, Hachioji; Takashi Hamaoka, Hino, both of Japan

[73] Assignee: Olympus Optical Co. Ltd., Japan

[21] Appl. No.: 337,780

[22] Filed: Jan. 7, 1982

[30] Foreign Application Priority Data

Jan. 7, 1981 [JP] Japan .................................. 56-268
Jan. 9, 1981 [JP] Japan ................................. 56-1158
Jan. 9, 1981 [JP] Japan ................................. 56-1159

[51] Int. Cl.³ .......................... G02B 7/11; F16F 13/00
[52] U.S. Cl. .................................. 350/247; 188/380; 350/255
[58] Field of Search ............... 350/255, 247; 250/201; 310/17, 20–22; 369/45, 44, 46; 188/378–380; 267/137; 73/430

[56] References Cited

U.S. PATENT DOCUMENTS

| | | | |
|---|---|---|---|
| 2,714,161 | 7/1955 | Featherstun | 188/378 |
| 3,143,883 | 8/1964 | Nakasone | 73/430 |
| 3,843,188 | 10/1974 | Kirschner | 188/379 |
| 4,023,651 | 5/1977 | Healiss | 188/378 |
| 4,135,206 | 1/1979 | Kleuters et al. | 369/45 |
| 4,367,543 | 1/1983 | Araki et al. | 250/201 |

FOREIGN PATENT DOCUMENTS 616474  7/1978  U.S.S.R. .............................. 188/379

OTHER PUBLICATIONS

Figler, B. D., "Precision Focus Control" Proc. Soc. of Photo-Optical Instrumention Engrs., SPIE, vol. 141, 1978, pp. 43–49.

*Primary Examiner*—William H. Punter
*Attorney, Agent, or Firm*—Parkhurst & Oliff

[57] ABSTRACT

In an apparatus for driving an objective lens which projects a light spot onto an information track recorded spirally or concentrically on a disc-shaped record medium to read out information, a lens holder for holding the objective lens is supported by an intermediate cylindrical member by means of a pair of upright leaf springs movably in a tracking direction, the intermediate cylindrical member is then supported by an outer fixed cylindrical member via a pair of spiral leaf springs movably in a focussing direction parallel to an optical axis of the objective lens, dampers made of elastic material are secured to the upright leaf springs and the spiral leaf springs so as to suppress resonance caused by the leaf springs. Therefore, precise focussing and tracing controls can be carried out without being affected by the undesired resonance of the leaf springs.

22 Claims, 17 Drawing Figures

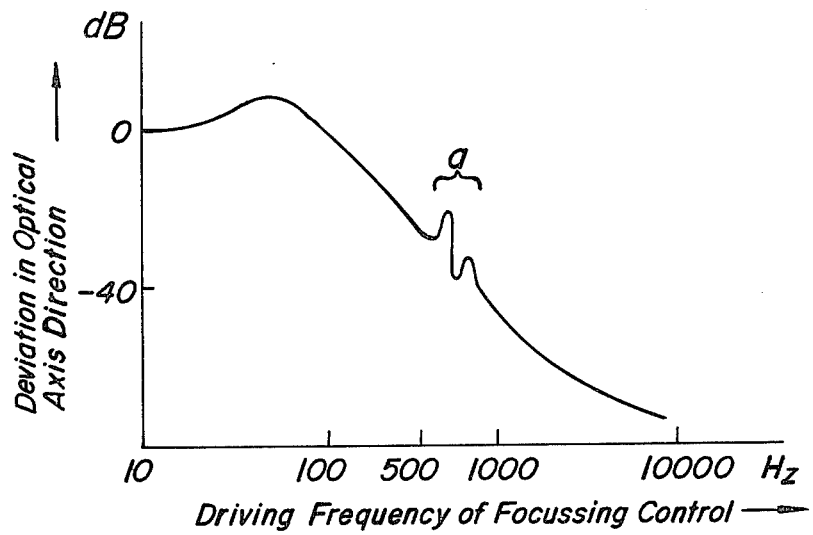
FIG._2A
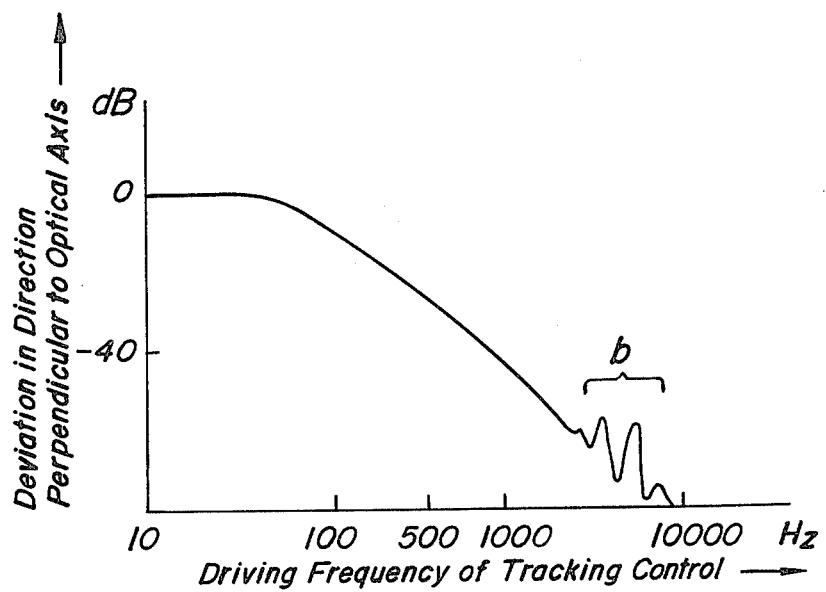
FIG._2B

APPARATUS FOR DRIVING OBJECTIVE LENS

BACKGROUND OF THE INVENTION

The present invention relates to an apparatus for driving an objective lens for reading out information from information tracks recorded spirally or concentrically on a disc-shaped record medium by projecting a light spot onto the record medium by means of the objective lens.

In an apparatus for reproducing or picking-up an information signal from the above mentioned record medium, the record medium is usually called as a video disc in which encoded video and audio signals are recorded as optical information such as an optical transmissivity, reflection, phase property. While the video disc is rotated at a high speed such as thirty revolutions per second, i.e. 1,800 rpm, a laser beam emitted from a laser light source such as a helium-neon gas laser is focussed on the tracks of the disc as a light spot and the optical information is read out. One of important properties of such a record medium is a very high density of recorded information and thus a width of the information track is very narrow and a space between successive tracks is also very narrow. In a typical video disc described in, for instance, Philips Technical Review, Vol. 33, 1973, No. 7, a pitch of the tracks amounts only to 2 $\mu$m. Therefore the diameter of light spot should be correspondingly small such as 1 to 2 $\mu$m. In order to pick-up correctly the recorded information from such tracks having very narrow width and pitch a mutual positional error between the light spot and tracks, i.e., a tracking error should be reduced as little as possible. In U.S. Pat. No. 3,909,608 and No. 3,882,317, it has been proposed to effect a so-called tracking control in which a mutual displacement of the light spot and track is photoelectrically detected to produce a tracking error signal and the light spot is moved or shifted in a direction perpendicular to the track in accordance with the detected tracking error signal. In the U.S. Pat. No. 3,882,317 as a tracking mechanism use is made of an oscillating mirror inserted in an optical path from a laser light source to an objective lens, and the mirror is rotated in accordance with the detected tracking error signal. However such a tracking mechanism could not attain a sufficiently high accuracy and is liable to be large in size. Further the known tracking mechanism is rather expensive.

In order to avoid the above mentioned drawback of the known tracking mechanism it has been further proposed that the objective lens on its holder is supported by a resiliently supporting member comprising springs, e.g. leaf springs, and the objective lens is moved in a direction perpendicular to the optical axis of objective lens as well as to the tangential direction of the information track by means of an electromechanical transducer in accordance with the tracking error signal. Hereinafter the direction in which the objective lens is moved for effecting the tracking control is termed as a tracking direction. As the electromechanical transducer use may be made of electromagnet, voice coil, piezoelectric element, etc. In order to obtain a good response property for tracking, the assembly should be made small in size and light in weight. In an actual reading-out apparatus in addition to the tracking error a so-called focussing error is produced in which the light spot could not be correctly focussed on the information track. For correcting the focussing error there should be provided with a focussing mechanism for moving or displacing the objective lens in a direction of its optical axis. When the tracking mechanism is installed on the focussing mechanism, the tracking mechanism should be smaller in size and lighter in weight for attaining an accurate focussing correction. In the tracking mechanism with the electromagnet a sufficiently large force necessary for moving the objective lens can be produced and the mechanism can be constructed small and light in a relatively simple manner. However, an accurate tracking correction could not be effected, because a relation between an amount of electric current passing through a coil of the electromagnet and an amount of displacement of the objective lens is not linear. In the tracking mechanism comprising a voice coil, a miniaturization could hardly be attained. Further the tracking mechanism with the piezoelectric elements could not produce a sufficently large driving force for driving the objective lens.

In order to avoid the above mentioned drawback, the applicant has proposed an apparatus for driving objective lens in U.S. patent application Ser. No. 139,756 filed on Apr. 14, 1980. FIGS. 1A and 1B are plane (half cross sectional) and longitudinal sectional views, respectively showing one embodiment of the apparatus for driving an objective lens 1 in a two-dimensional direction disclosed in the aforesaid U.S. patent application Ser. No. 139,756 filed on Apr. 14, 1980. A lens holder 2 made of a magnetic material is coupled with an intermediate cylindrical body 4 by means of a pair of leaf springs 3 and 3' which extend upright in parallel with each other symmetrically with respect to an optical axis of the lens 1. Moreover, a cylindrical body 17 made of magnetic material is coaxially arranged outside the lens holder 2. Therefore, the objective lens 1 can shift in a tracking direction shown by an arrow A perpendicular to an optical axis as shown in FIG. 1A. The intermediate cylindrical body 4 is secured to an outer cylindrical body 6 by means of a pair of spirally disc-shaped springs 5 and 5'. Therefore, the intermediate cylindrical body 4 is arranged movably in the optical axis of the objective lens 1 as shown by an arrow B in FIG. 1B. First and second yokes 7 and 7' cooperating with the lens holder 2 made of magnetic material and permanent magnets 8, 8' are secured to an outer cylindrical body 6 by a yoke supporting ring 15. In this manner, the lens holder 2 can be moved in the optical axis direction together with the intermediate cylindrical body 4 by supplying electric current to the coil 11. Since the yokes 7, 7' and magnets 8, 8' are fixedly arranged, the movable portion of the apparatus can be made light in weight. Coils 9 and 9' are would around the first and the second yokes 7, 7', respectively. Further, a moving coil 11 is wound around a ring 10 formed integrally with the cylindrical body 4 and a ring-shaped permanent magnet 12 and ring-shaped yokes 13, 14 cooperating with the coil 11 are secured to the outer cylindrical body 6 by means of a ring-shaped holder 16.

In the apparatus mentioned above, it is possible to move the objective lens 1 by a given amount in the direction A perpendicular to the optical axis by supplying an electric current corresponding to a tracking error to the first and second coils 9, 9'. Therefore, it is possible to obtain a sufficiently large force for effecting the tracking control, and to make the apparatus small and light in its size and weight. Moreover, it is also possible to move the objective lens 1 by a given amount in the optical axis direction B by supplying an electric current corresponding to a focussing error to the coil 11.

FIG. 2A is a characteristic curve of the above mentioned apparatus showing a relation between a driving frequency of focussing control and an amount of deviation of the lens in the optical axis. In FIG. 2A, a vertical axis shows an amount of deviation of the objective lens in the optical axis as dB, and a horizontal axis shows a driving frequency of the focussing control signal supplied to the moving coil 11. The characteristic curve includes undesired disturbance near 500 Hz marked by a due to resonance of arms of the disc-shaped springs 5, 5'. FIG. 2B is a characteristic curve of the tracking mechanism representing a relation between an amount of deviation of the lens in the tracking direction and a driving frequency of the tracking control signal supplied to the coils 9, 9'. This curve also includes disturbance in a range between 2 KHz and 10 KHz due to resonance of the leaf springs 3, 3' as shown by b in FIG. 2B. Therefore, the known apparatus for driving the objective lens has a serious drawback that focussing control and tracking control can not be performed accurately because of the disturbances in the characteristic curves due to the resonance of the resilient supporting springs.

SUMMARY OF THE INVENTION

The present invention has for its object to provide a novel and useful apparatus for driving an objective lens which can obviate the above mentioned drawbacks of the known apparatus and can perform a precise control by reducing the disturbances due to resonance of springs by means of a damper so as to drive accurately the objective lens in the tracking and/or focussing directions.

According to the invention, an apparatus for driving an objective lens for correcting a relative positional error comprises means for holding the objective lens; means for supporting resiliently the objective lens holding means movably in a given direction; means for driving said holding means and thus the objective lens in said given direction so as to reduce said positional error; and damping means secured to said supporting means for absorbing undesired resonance of said supporting means.

BRIEF DESCRIPTION OF THE DRAWINGS

FIGS. 2A and 2B are characteristic curves illustrating relation between deviation of the lens and driving frequency in the apparatus shown in FIGS. 1A and 1B;

DESCRIPTION OF THE PREFERRED EMBODIMENT

Figure 1A:
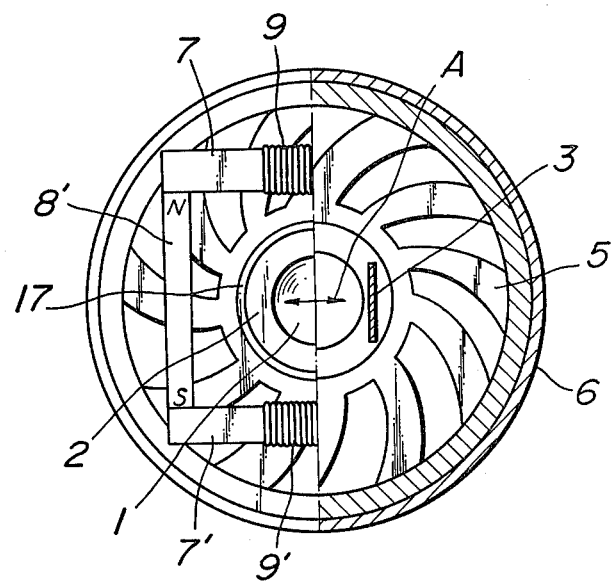
FIGS. 1A and 1B are plane (half cross sectional) and longitudinal sectional views, respectively showing an embodiment of a known apparatus for driving an objective lens two-dimensionally.
Figure 1B:
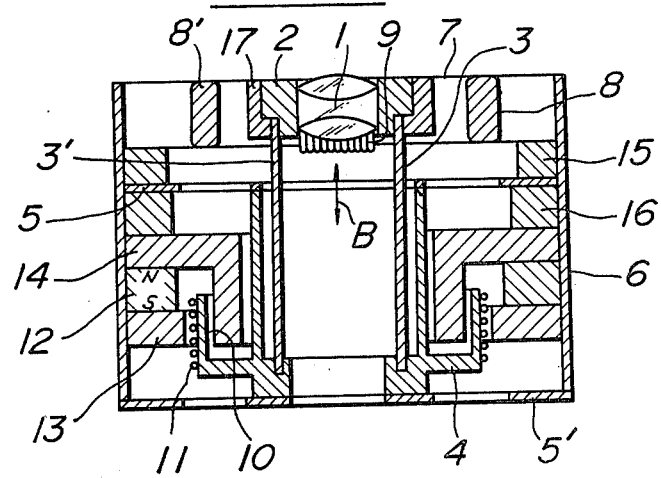
Figure 3A:
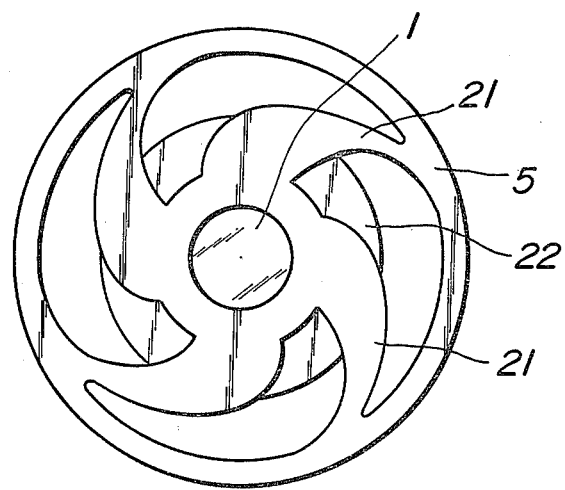
FIGS. 3A and 3B are plane and longitudinal sectional views, respectively depicting one embodiment of the apparatus for driving objective lens in its optical axis direction according to the invention.
Figure 3B:
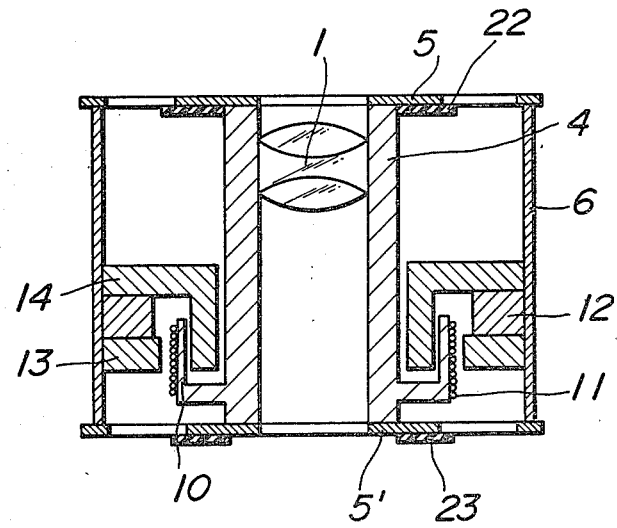

FIGS. 3A and 3B are plane and longitudinal sectional views, respectively showing one embodiment of the apparatus according to the invention for driving an objective lens in its optical axis direction. For the sake of simplicity, in FIGS. 3A and 3B similar portions to those in FIGS. 1A and 1B are denoted by the same reference numerals used in FIGS. 1A and 1B.

In this embodiment, an objective lens 1 is secured to an intermediate cylindrical body 4, which comprises an objective lens holding means, and which is secured to an outer cylindrical body 6 by means of disc-shaped spiral leaf springs 5, 5'. A width of an arm 21 of these leaf springs 5, 5' is changed continuously from a center to a periphery centrally located annular root portion, which is fixed to the objective lens holding means, to an outer peripheral portion near the outer cylindrical body 6 in such a manner that the central portion is thick and the outer peripheral portion becomes thin. To these leaf springs are secured disc-shaped annular dampers 22 and 23, having an inner diameter and an outer diameter, made of elastic material such as rubber, such that a surface portion of the annular damper located adjacent the inner diameter is secured to a parallel surface on the spiral leaf spring adjacent the centrally located annular root portion. Therefore, it is possible to effect a precise focussing control by supplying an electric current depending upon a focussing error to a moving coil 11 so as to move the intermediate cylindrical body 4 and thus the objective lens 1, in the direction of the optical axis, because even if a frequency of the electric current supplied to the moving coil 11 becomes near a resonance frequency of these leaf springs 5, 5', no resonance is occurred due to the damping action of the ring dampers 22, 23. The leaf springs 5, 5' may be formed by plates having a thickness of 0.05 mm and made of phosphor bronze or beryllium copper. The minimum and maximum dimensions of the arm 21 are 1 mm at the outer portion and 1.8 mm at near the center portion, respectively. The combination of the spiral leaf springs 5, 5' and the ring dampers 22, 23 to the disc-shaped leaf springs 5, 5' can obviate the undesired resonance of the springs 5, 5' without deteriorating the spring characteristics such as spring constant.

Figure 4A:
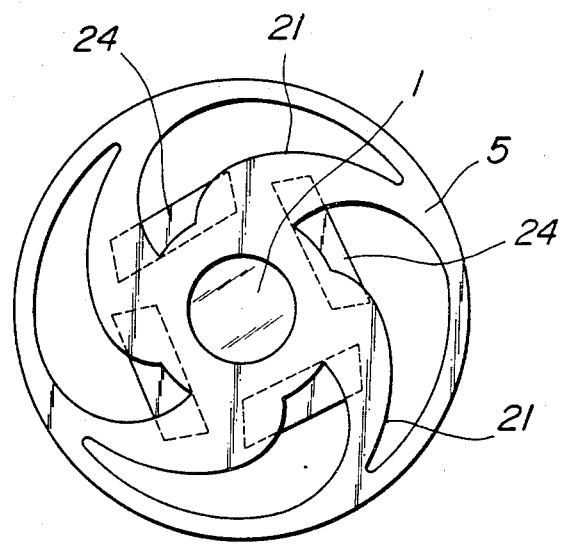
FIGS. 4A and 4B are plane and vertical sectional views, respectively shwoing another embodiment of the apparatus according to the invention.
Figure 4B:
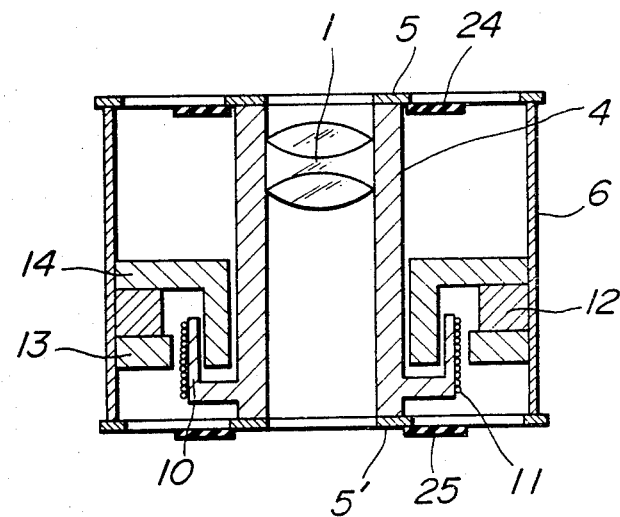

FIGS. 4A and 4B are plane and longitudinal sectional views, respectively showing a modified embodiment of the apparatus according to the invention illustrated in FIGS. 3A and 3B. In this modified embodiment, a plurality of damper chips 24, 25 constituted of elastic material are secured to the disc-shaped leaf springs 5, 5' in such a manner that they bridge adjacent arms of the springs 5, 5' as shown in FIG. 4A. Although the damper chips 24, 25 are secured to all arms 21 of the leaf springs 5, 5', according to the present invention it is not always necessary to arrange the damper chips in all spaces and further one or more damper chips may be secured to any one of the leaf springs. Moreover, in the embodiments since the objective lens 1 is moved only in the optical axis so as to effect the focussing control, a tracking control must be performed by arranging a swingable mirror in the optical axis between a light source and the objective lens.

Figure 5:
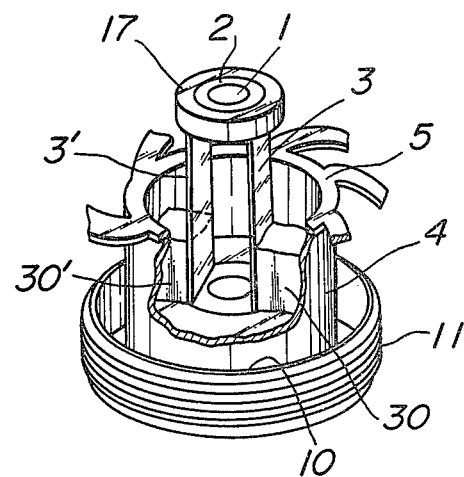
FIG. 5 is a perspective and partially cross sectional view illustrating one embodiment of the apparatus for driving the objective lens in a tracking direction according to the invention.

FIG. 5 is a perspective and partially sectional view illustrating one embodiment of a main portion of the apparatus according to the invention, in which the objective lens is supported movably in a tracking direction as well as in a focussing direction. Also in this embodiment the same portions as those illustrated in FIGS. 1A and 1B are denoted by the same reference numerals used in FIGS. 1A and 1B and same construction and operation are not explained here. The movable support provided for tracking necessitates the addition of an annular lens holder 2 which is connected with an intermediate cylindrical body 4 by elongated leaf springs 3, 3'.

In this embodiment damper blocks 30, 30' made of elastic material are fixedly arranged in spaces between the inner wall of cylindrical body 4 and adjacent a first end portion of respective leaf springs 3, 3' in such a manner that the damper blocks 30, 30' do not lose their elasticity. In this apparatus, when an electric current corresponding to the tracking error is supplied to the fixed coils 9, 9', the lens 1 can be shifted in the tracking direction without causing the resonance of the leaf springs, because the elastic damper blocks 30, 30' can absorb such a resonance effectively. Then, it is possible to make the frequency characteristic of the leaf springs to be linear over a wide frequency range up to about 8 KHz. Moreover, it has been confirmed that the damper blocks 30, 30' do not affect the focussing control and the objective lens 1 can be moved freely in its optical axis direction.

Figure 6:
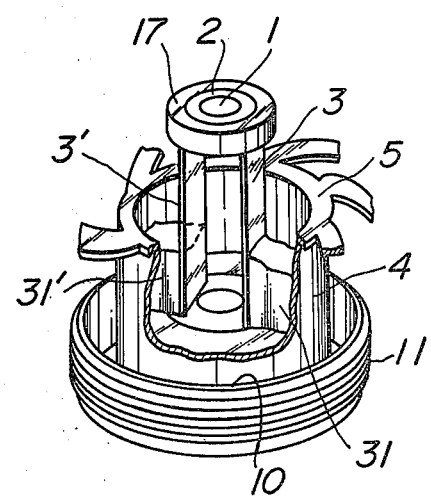
FIG. 6 is a perspective view depicting another embodiment of the apparatus according to the invention.

FIG. 6 is a perspective view illustrating another embodiment of the apparatus according to the invention similar to that shown in FIG. 5. In the present embodiment, damping members 31, 31' are formed by filling spaces between the inner wall of cylindrical body 4 and respective leaf springs 3, 3', adjacent first end portions of said leaf springs, with elastic material. The elastic material may be advantageously synthetic adhesive material which can adhere both to the cylindrical body 4 and the respective leaf springs 3, 3'. Also in this embodiment, it is possible to reduce the resonance of the leaf springs 3, 3' effectively and to improve the frequency characteristic of them.

Figure 7:
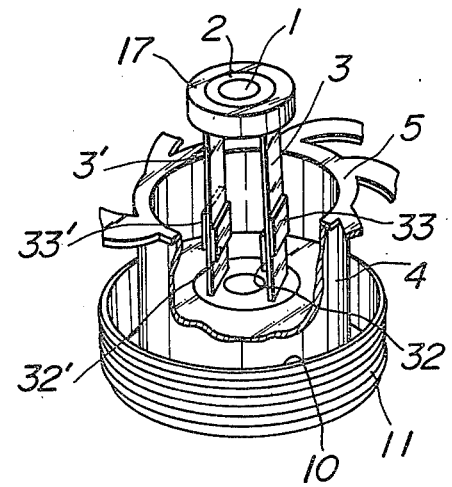
FIG. 7 is a perspective view showing still another embodiment of the apparatus according to the invention.

FIG. 7 is a perspective and partially sectional view showing still another embodiment of the apparatus according to the invention. In the present embodiment sheet-like damper chips 32, 32' and 33, 33', made of elastic material are adhered to inner and outer surfaces of the respective leaf springs 3, 3', adjacent first end portions of said leaf springs. Also in the embodiment, it is possible to restrain the resonance of the leaf springs 3, 3' and to make the frequency characteristic of them sufficiently good.

Figure 8A:
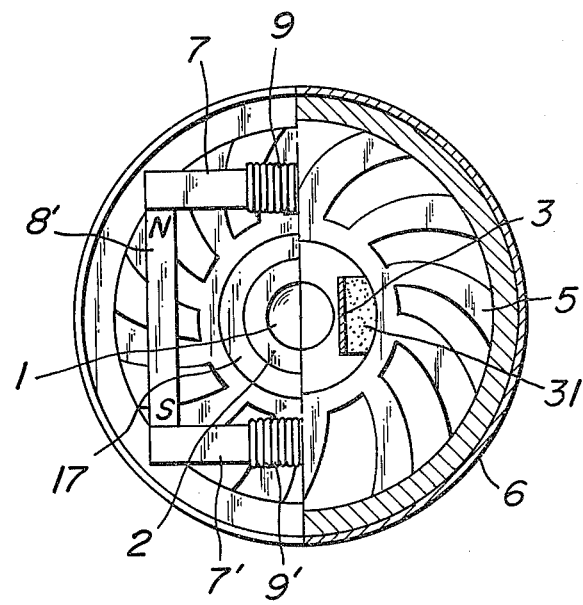
FIGS. 8A and 8B are plane (half cross sectional) and longitudinal sectional views, respectively illustrating a whole construction of the apparatus shown in FIG. 6.
Figure 8B:
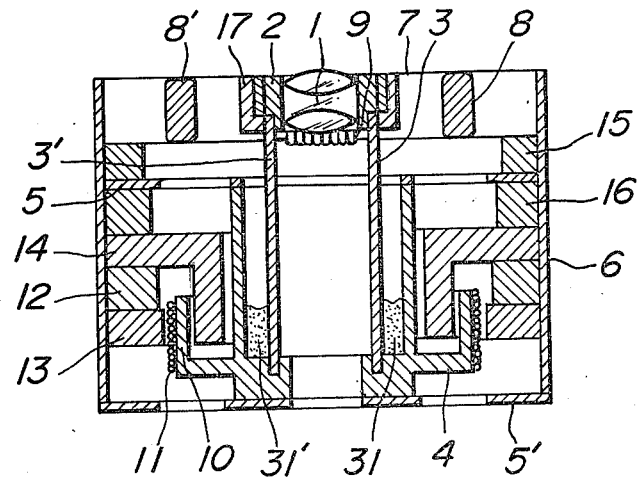

FIGS. 8A and 8B are plane (half cross sectional) and longitudinal sectional views, respectively showing one embodiment of the apparatus according to the invention comprising the driving mechanism shown in FIG. 6. Since the construction and operation of this embodiment are completely same as those shown in FIG. 6, an explanation of this embodiment is omitted here.

Figure 9A:
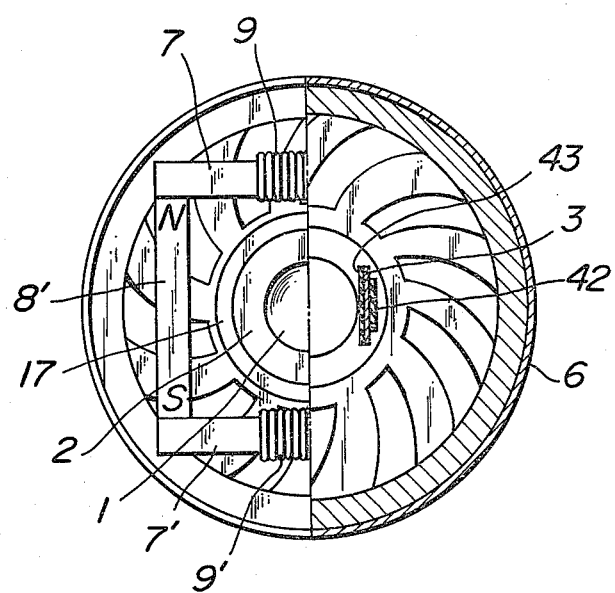
FIGS. 9A and 9B are plane (half cross sectional) and longitudinal sectional views, respectively depicting another embodiment of the apparatus according to the invention.
Figure 9B:
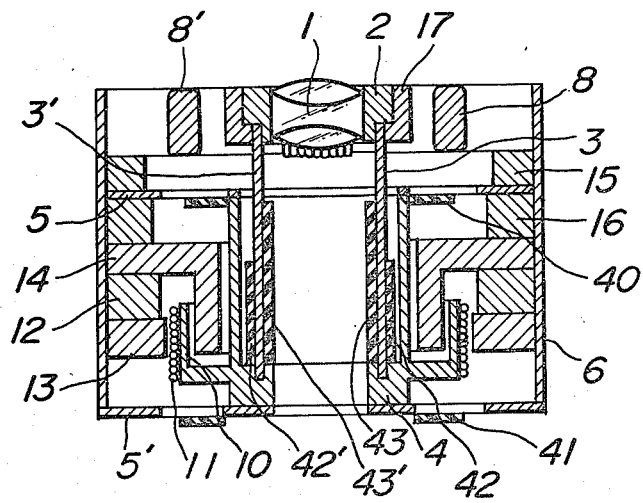

FIGS. 9A and 9B are plane (half cross sectional) and longitudinal sectional views, respectively showing one embodiment of the apparatus according to the invention, in which both the tracking damper and focussing damper are arranged. In this emmbodiment, ring-shaped dampers 40, 41 made of elastic material are secured to the disc-shaped leaf springs 5, 5'. The ring-shaped dampers 40, 41 may be preferably formed by chloroprene rubber or isobutylene-isoprene rubber. In this embodiment, dimensions of elastic dampers 40, 41 are as follows: thickness is 0.2 mm, outside diameter is 16 mm, and inner diameter is 10 mm. Further, sheet-like dampers 42, 43, 42', 43' made of elastic material are also secured to the leaf springs 3, 3'. The objective lens 1 is deviated in the optical axis direction by supplying an electic current to the moving coil 11 without causing undesired resonance of the spiral springs 5, 5', and is further deviated in a direction perpendicular to the optical axis by supplying an electric current to the fixed coils 9, 9' without generating troublesome resonance of the leaf springs 3, 3'. It should be noted that the ring-shaped dampers 40 and 41 may be arranged on opposite sides or both sides of the spiral springs 5, 5'. Moreover, although in this embodiment the dampers 42, 42', 43, 43' are arranged on both sides of the leaf springs 3, 3', it is also possible to arrange them on only one side of the springs.

Figure 10A:
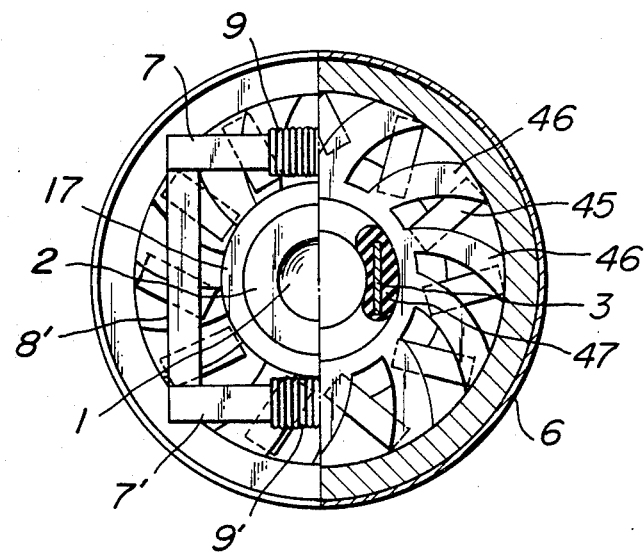
FIGS. 10A and 10B are plane (half cross sectional) and longitudinal sectional views, respectively showing still another embodiment of the apparatus according to the invention.
Figure 10B:
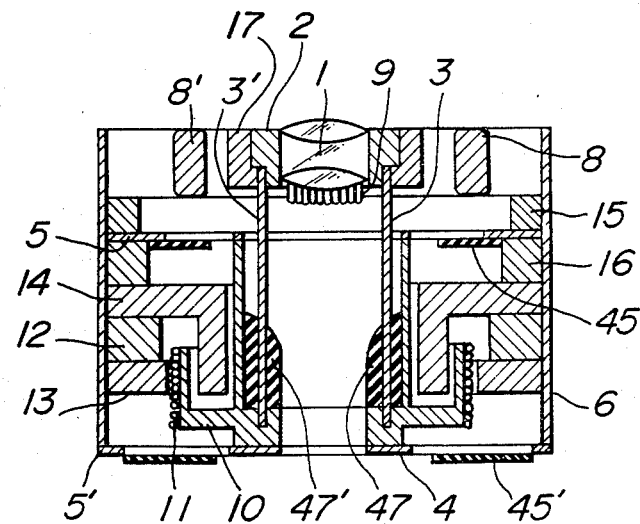

FIGS. 10A and 10B are plane (half cross sectional) and longitudinal sectional views, respectively showing still another embodiment of the apparatus according to the invention. In this embodiment, instead of arranging the ring-shaped dampers 40, 41, damper chips 45, 45' are arranged between adjacent arms 46 of the disc-shaped leaf springs 5, 5'. Moreover, in this embodiment, instead of arranging the sheet-like dampers 42, 43, elastic dampers 47, 47' are formed by pouring adhesive material around the leaf springs 3, 3'.

As described above, according to the invention, since the elastic dampers can effectively suppress the undesired resonance of the resiliently supporting members, it is possible to move the objective lens in the optical axis direction and/or the tracking direction in a linear manner over a very wide frequency range and thus, focussing control and/or tracking control can be carried out very precisely. Further, the dampers can be provided in a very simple manner.

What is claimed is:

1. An apparatus for driving an objective lens in its optical axis direction for effecting a focussing control comprising:

a cylindrical frame;

means for holding the objective lens;

a plurality of spiral leaf springs, each partially extending in a plane which is substantially perpendicular to the optical axis of the objective lens, each spiral leaf spring having a centrally located annular root portion fixed to the objective lens holding means and each sprial leaf spring having a plurality of arcuate arms having two ends occurring in a plane which is substantially perpendicular to the optical axis of the objective lens, a first end is fixed to said cylindrical frame and a second end is fixed to said annular root portion;

means for driving the objective lens in the optical axis direction in accordance with a focus control signal, thereby correcting any focussing error; and a plurality of damping members partially extending in a plane which is substantially perpendicular to the optical axis of the objective lens, each of said damping members contacting a spiral leaf spring near said annular root portion of the spiral leaf spring.

2. The apparatus of claim 1, wherein said damping members comprise elastic disc-shaped annular damper sheets, a surface adjacent to an inside diameter of one disc-shaped annular sheet is secured to a parallel surface on one spiral leaf spring adjacent the annular root portion of the spiral leaf spring.

3. The apparatus of claim 1, wherein said damping members comprise a plurality of elastic damper chips, each chip having a first end portion and a second end portion, said first end portion is secured to a first arcuate arm and said second end portion is secured to a second arcuate arm.

4. The apparatus of claim 3, wherein said first arcuate arm and said second arcuate arm are circumferentially, consecutively located.

5. The apparatus of claim 3, wherein surfaces adjacent to said first and second end portions are respectively secured to parallel surfaces on said first arcuate arm and said second arcuate arm.

6. The apparatus of claim 1, wherein there are two spiral leaf springs.

7. The apparatus of claim 1, wherein there are two damping members.

8. The apparatus of claim 2, wherein there are two elastic disc-shaped annular damper sheets.

9. The apparatus of claim 1, wherein said second end of each arcuate arm is circumferentially wider than said first end of each arcuate arm.

10. The apparatus of claim 1, wherein said objective lens holding means comprises an annular lens holder, an intermediate cylindrical body secured to the spiral leaf springs adjacent said annular root portions on the spiral leaf springs, a plurality of elongated leaf springs having a first end portion secured to said intermediate cylindrical body and a second end portion secured to the annular lens holder, the plurality of elongated leaf springs extending in a substantially parallel relationship with the optical axis of the objective lens, means for driving the objective lens in a direction perpendicular to said optical axis, thereby providing for a tracking control, and a plurality of second damping members, each damping member is provided adjacent said first end portion of each elongated leaf spring.

11. The apparatus of claim 10, wherein each of said second damping members comprises an elastic damper block positioned between each elongated leaf spring and the intermediate cylindrical body.

12. The apparatus of claim 11, wherein the elastic damper block is adhered to at least one surface of each elongated leaf spring near said first end portion of each elongated leaf spring.

13. The apparatus of claim 10, wherein each of said second damping members comprises an elastic filling filled into a space created between each elongated leaf spring and the intermediate cylindrical body.

14. The apparatus of claim 13, wherein the elastic filling is filled into a space near said first end portion of each elongated leaf spring.

15. The apparatus of claim 10, wherein each of said second damping members comprises a sheet-like elastic chip adhered to at least one surface of each elongated leaf spring.

16. The apparatus of claim 15, wherein the sheet-like elastic chip is adhered to at least one surface of each elongated leaf spring near said first end portion of each elongated leaf spring.

17. The apparatus of claim 10, wherein there are two spiral leaf springs.

18. The apparatus of claim 10, wherein there are two elongated leaf springs.

19. An apparatus for driving an objective lens in its optical axis direction for effecting a focussing control comprising:
a cylindrical frame;
means for holding the objective lens;
a pair of spiral leaf springs, each partially extending in a plane which is substantially perpendicular to the optical axis of the objective lens, each spiral leaf spring having a centrally located annular root portion fixed to the objective lens holding means and each spiral leaf spring having a pair of arcuate arms having two ends occurring in a plane which is substantially perpendicular to the optical axis of the objective lens, a first end is fixed to said cylindrical frame and a second end is fixed to said annular root portion;
means for driving the objective lens in the optical axis direction in accordance with a focus control signal, thereby correcting any focussing error; and
a pair of damping members partially extending in a plane which is substantially perpendicular to the optical axis of the objective lens, each of said damping members contacting a spiral leaf spring near said annular root portion of the spiral leaf spring.

20. An apparatus for driving an objective lens in its optical axis direction and in a direction perpendicular to its optical axis direction for effecting a focussing control and a tracking control comprising:
a cylindrical frame;
means for holding the objective lens comprising
an annular lens holder, an intermediate cylindrical body, a plurality of elongated leaf springs having a first end portion secured to said intermediate cylindrical body and a second end portion secured to the annular lens holder, the plurality of elongated leaf springs extending in a substantially parallel relationship with the optical axis of the objective lens, means for driving the objective lens in a direction perpendicular to said optical axis, thereby providing for a tracking control, and a plurality of first damping members, each damping member is provided adjacent said first end portion of each elongated leaf spring;
a plurality of spiral leaf springs, each partially extending in a plane which is substantially perpendicular to the optical axis of the objective lens, each spiral leaf spring having a centrally located annular root portion fixed to said intermediate cylindrical body and each spiral leaf spring having a plurality of arcuate arms having two ends occurring in a plane which is substantially perpendicular to the optical axis of the objective lens, a first end is fixed to said cylindrical frame and a second end is fixed to said annular root portion;
means for driving the objective lens in the optical axis direction in accordance with a focus control signal, thereby correcting any focussing error;
means for driving the objective lens in a direction perpendicular to the optical axis direction in accordance with a tracking control signal, thereby correcting any tracking error; and a plurality of second damping members partially extending in a plane which is substantially perpendicular to the optical axis of the objective lens, each of said second damping members contacting a spiral leaf spring near said annular root portion of the spiral leaf spring.

21. The apparatus of claim 20, wherein there are two spiral leaf springs.

22. The apparatus of claim 20, wherein the plurality of said second damping members comprise two elastic disc-shaped annular damper sheets.

* * * * *